United States Patent [19]

Lewak et al.

[11] Patent Number: 5,544,360
[45] Date of Patent: Aug. 6, 1996

[54] METHOD FOR ACCESSING COMPUTER FILES AND DATA, USING LINKED CATEGORIES ASSIGNED TO EACH DATA FILE RECORD ON ENTRY OF THE DATA FILE RECORD

[75] Inventors: Jerzy Lewak, Del Mar; Slawek Grzechnik, La Mesa; Jon Matousek, San Diego, all of Calif.

[73] Assignee: Paragon Concepts, Inc., Solana Beach, Calif.

[21] Appl. No.: 384,379

[22] Filed: Feb. 3, 1995

Related U.S. Application Data

[63] Continuation of Ser. No. 980,620, Nov. 23, 1992, abandoned.

[51] Int. Cl.$^6$ ........................................ G06F 17/30
[52] U.S. Cl. .............. 395/600; 364/253; 364/253.3; 364/282.1; 364/282.3; 364/283.1; 364/283.2; 364/283.3; 364/286.4; 364/286.5
[58] Field of Search .................... 364/282.1, 282.3, 364/283.1, 283.2, 283.3, 286.4, 286.5

[56] References Cited

U.S. PATENT DOCUMENTS

| | | | |
|---|---|---|---|
| 5,047,918 | 9/1991 | Schwartz et al. | 364/200 |
| 5,115,504 | 5/1992 | Belove et al. | 395/600 |
| 5,162,992 | 11/1992 | Williams | 364/419 |
| 5,201,047 | 4/1993 | Maki et al. | 395/600 |
| 5,201,048 | 4/1993 | Coulter et al. | 395/600 |
| 5,204,947 | 4/1993 | Bernstein et al. | 395/157 |
| 5,206,949 | 4/1993 | Cochran et al. | 395/600 |
| 5,276,867 | 1/1994 | Kenley et al. | 395/600 |

OTHER PUBLICATIONS

Van Kir., "Lotus, Traveling Software Tackle DOS File Management Problems", Apr. 1989, V2R4 p. 35(2) PC-Computing.
PC Tools DOS & Shell/File Manager, 1991, pp. 33-35, (Version 7 For DOS) Central Point Software Inc.
Central Point Software Inc. PC Tools Data Recovery And Systems Utilties, 1991, pp. 95-97 (Ver. 7 For DOS).
Thought Pattern Handbook, By Bananafish Software, Inc., 1991 San Francisco, CA.

*Primary Examiner*—Thomas G. Black
*Assistant Examiner*—Jack M. Choules
*Attorney, Agent, or Firm*—Fish & Richardson P.C.

[57] ABSTRACT

A computer filing system for accessing files and data according to user-designated criteria. The system allows the user to define a virtually unlimited number of hybrid folders by describing, using terms of their own selection, the file contents of those files which are to belong to particular hybrid folders. Such hybrid folders can be implemented on top of, and used in addition to, the normal hierarchical structured directory, or they may replace such normal structures entirely. The inventive computer file control system could therefore be used as the basis of a new computer operating system. In the process of search and retrieval, the invention ensures in two ways that the user defines a filter which will always find at least one file. The user is not required to type the key words to search but instead chooses the words from pick lists, making mistyping impossible. As the user builds the search filter definition, categories which would find no data are automatically excluded as pick list possibilities.

21 Claims, 4 Drawing Sheets

| FILE_TYPE | CONTENTS | ACTION | NAMES |
|---|---|---|---|
| 000 AGREEMENT | 100 ADDRESSES | 200 ADVANCES | 300 JONES |
| 001 COMPARISON | 101 FEATURES | 201 BETA TESTING | 301 MACQWERTY |
| 002 DOCUMENTATION | 102 INVITATION | 202 BUGS | 302 MACTAG |
| 003 E- MAIL | 103 OFFICE | 203 COMPUTERS | 303 MCARTHY |
| 004 LEGAL | 104 PLAN | 204 DEMOS | 304 NISUS |
| 005 LETTER | 105 PROGRAMMING | 205 EMPLOYEES | 305 PETER |
| 006 LIST | 106 PROMOTION | 206 PATENT | 306 PUP |
| 007 MACRO | 107 REQUEST | 207 RECEIVED | 307 SMITH |
| 008 MEMOS | 108 RESEARCH | 208 REPLY | 308 SOLO WRITER |
| 009 MINUTES | 109 SALES | 209 SENT | 309 TECHFONTS |
| 010 NEWS RELEASE | 110 TELEPHONE #S | 210 TO SEND | 310 THOMPSON |
| • | • | • | • |
| • | • | • | • |
| • | • | • | • |

FIG. 3

| FILE_NAME | FILE_LOC | DATE/TIME | NO_CATEGORIES | CATEGORY_ARRAY |
|---|---|---|---|---|
| jones.mem | c:\memos | 01-01-80 01:30 | 2 | 008, 300 |
| minutes.1 | f:\wpdocs | 10-10-90 10:10 | 3 | 009, 103, 109 |
| • | • | • | • | • |
| • | • | • | • | • |
| • | • | • | • | • |

FIG. 4

FIG. 5

METHOD FOR ACCESSING COMPUTER FILES AND DATA, USING LINKED CATEGORIES ASSIGNED TO EACH DATA FILE RECORD ON ENTRY OF THE DATA FILE RECORD

This is a continuation of application Ser. No. 07/980,620 filed on Nov. 23, 1992, now abandoned.

NOTICE OF COPYRIGHTS

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field of the Invention

This invention relates generally to computer file control systems, and more specifically to a flexible system for accessing computer files and data therein according to user-designated criteria.

2. Description of Related Art

Many currently-existing computer file control systems employ a hierarchical filing structure. This system emulates commonly-used paper filing systems, but is more general and is capable of more extensive use. Thus, for example, in a paper filing system, a filing cabinet may contain 4 or 5 drawers. Each drawer may contain perhaps a dozen or so hanging files and each file may contain two or three file folders. Typically, a hanging file can only hold a very small number of file folders before it becomes unmanageable, so that a new hanging file needs to be started.

A typical computer system organizes data into files (analogous to papers in a paper filing system) and directories (analogous to file folders and hanging files). Indeed, in graphically-oriented computer systems, directories are sometimes known as "folders." Directories may contain other directories (also referred to as subdirectories) and files.

Figure 1:
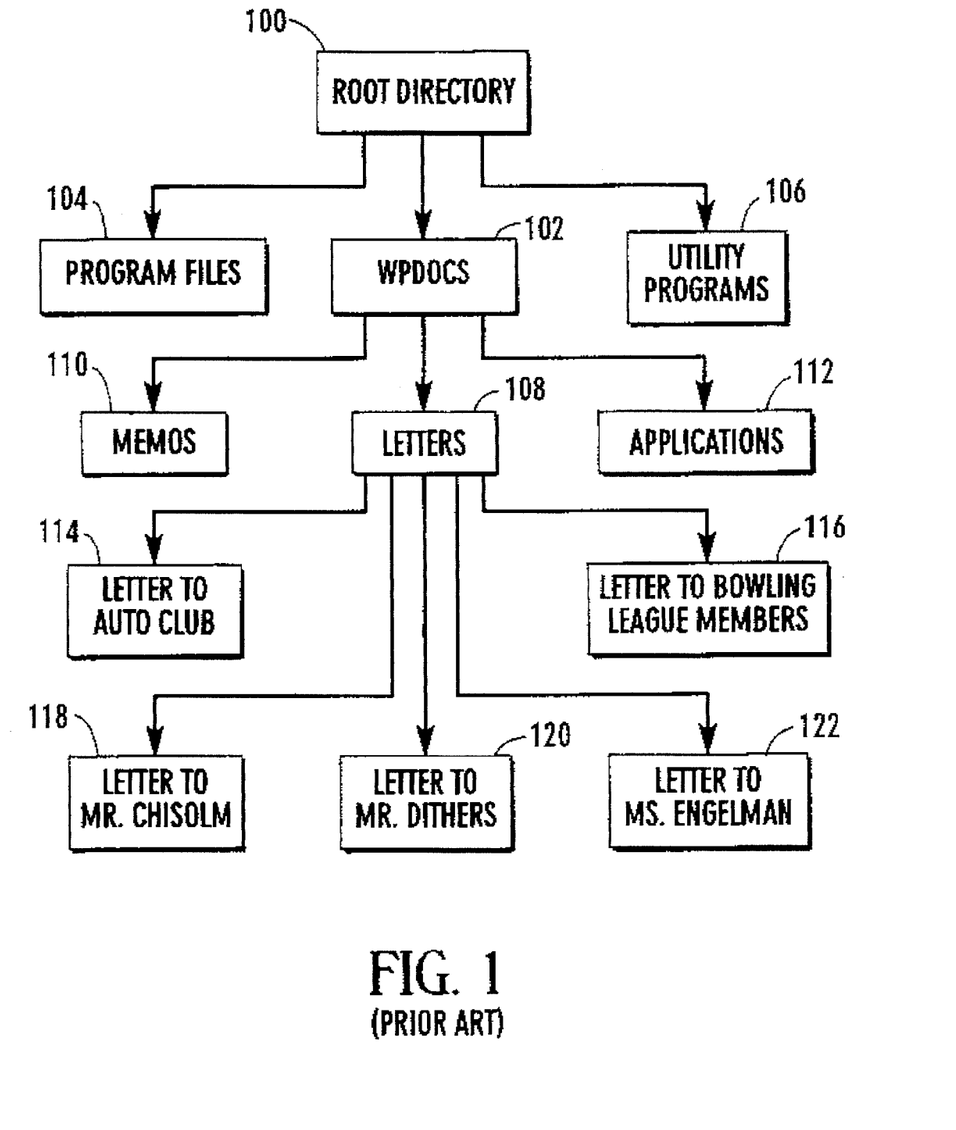
FIG. 1 is a tree diagram illustrating the organizational structure of a typical prior art computer filing system.

FIG. 1 shows a simplified typical hierarchical tree-type directory structure. This structure is called "tree" because it looks like an upside-down tree, with the base, or "root" of the tree at the top. Subdirectories are often referred to as "branches" of the tree, and files are often referred to as leaves of the tree.

In FIG. 1, the root directory 100 contains a number of subdirectories 102–112 and files 114–122. The subdirectories 102–112 may contain other subdirectories and files, and so on.

In typical use, directories often contain files having similar kinds of data. Also, the name of the directory is typically selected to be descriptive of the kinds of files and directories therein. For example, a WPDOCS directory 102 might contain wordprocessing documents and directories for holding specific categories of such documents. For example, a LETTERS directory 108 may contain only files which are letters: "LETTER TO AUTO CLUB" 114, "LETTER TO BOWLING LEAGUE MEMBERS" 116, "LETTER TO MR. CHISOLM" 118, "LETTER TO MR. DITHERS" 120, and "LETTER TO MS. ENGELMAN" 122. Memos could be stored in a "MEMOS" subdirectory 110, patent applications in an "APPLICATION" subdirectory 112, etc.

Custom structures of such directories are created so as to make the storing and retrieval of files convenient. If the number of files to be stored is small and the number of different file kinds is either small or very well defined, this type of file storage structure works well. However, several problems arise when the number of files becomes large, or if the file categories are not well-defined. In such cases, the hierarchical filing structure becomes very cumbersome to use for the following reasons:

1. The tree becomes quite deep, and so it takes more time to get to the end of any branch.
2. It becomes more difficult for the user to decide where to store a particular file.

As a result, finding particular files becomes harder and harder. Frequently, the user is not able to clearly and unambiguously associate a desired file with any one directory. In fact, the user often associates a file with several subdirectories. This happens both when a file is being saved and when it is being retrieved. The same problem arises in paper filing systems. Quite often a document may logically belong within many different folders, with the result that it is difficult to find a desired document once the document has been filed.

Clearly, a hierarchical topic-oriented file structure is too rigid for many applications where information must be organized into files. It has been found that users generally think in terms of overlapping categories or descriptions of file content, rather than in very strictly-defined, non-overlapping topics.

Figure 2:
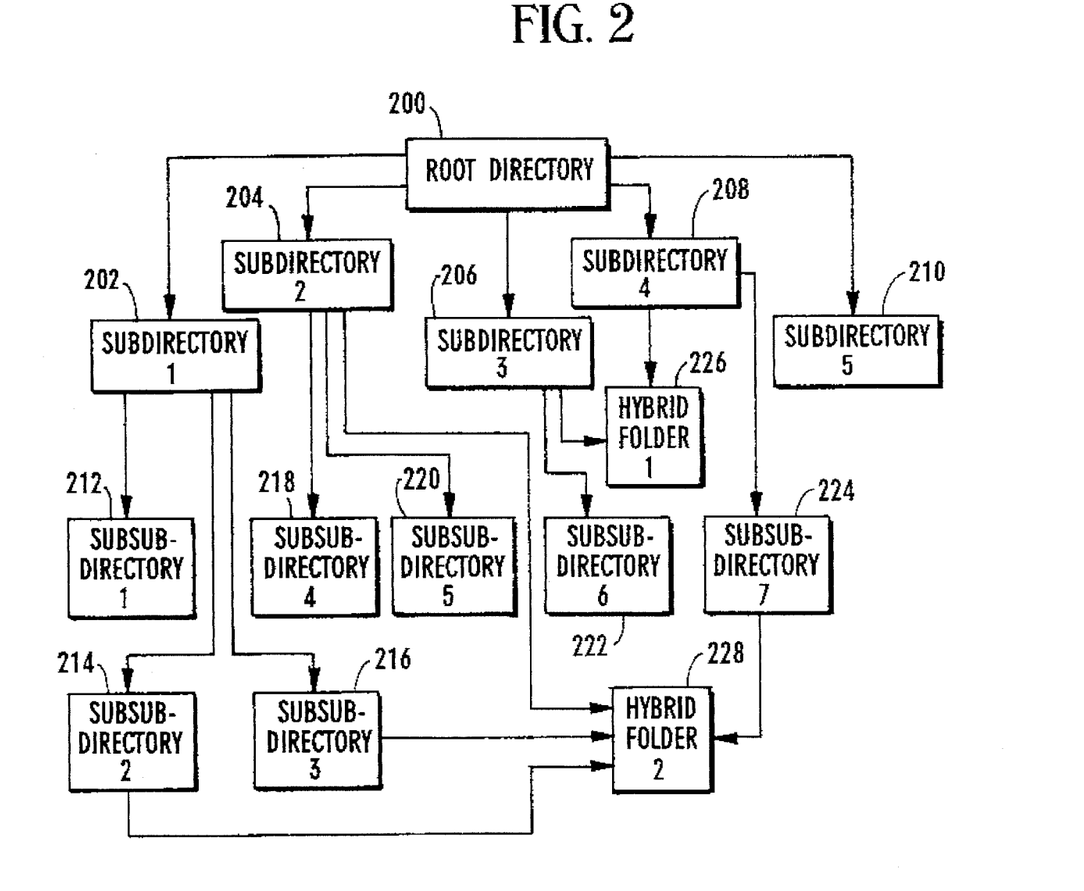
FIG. 2 is a tree diagram illustrating the organizational structure of the computer filing system of the present invention.

For example, referring now to FIG. 2, a root directory 200 has five subdirectories 202–210. In this example, subdirectory 202 has three "sub"-subdirectories 212–216, subdirectory 204 has two "sub"-subdirectories 218–220, subdirectory 206 has one "sub"-subdirectory 222, and subdirectory 208 has one "sub"-subdirectory 224. A file might logically belong in subdirectory 204, sub-subdirectory 214, sub-subdirectory 216, and sub-subdirectory 224. Similarly, another file might logically belong in subdirectory 206 and subdirectory 208.

Therefore, what is really needed are "hybrid" logical directories or folders, which contain those files whose content overlaps more than one physical directory. Thus, in the present example, a first hybrid logical directory 226 would contain each file that logically belongs in subdirectory 206 and subdirectory 208. Similarly, a second hybrid logical directory 228 would contain each file that logically belongs in subdirectory 204, sub-subdirectory 21 4, sub-subdirectory 21 6, and sub-subdirectory 224.

In the typical hierarchical directory structure illustrated in FIG. 1, "hybrid" directories are not possible. Thus, it is very desirable to provide a method for accessing files consonant with the way users think of them, and not limited to how such files are stored in the computer.

Some systems have been developed to overcome the rigidity of typical hierarchial directory structures, but these systems have limitations. In one such method, all the words in a file are indexed and a concordance list associated with each file is created. The user then may search for files by file word content by defining "search filters", which are search terms in logically defined combinations (e.g., a search filter comprising "Smith" AND "tooling" would locate all documents having both the word "Smith" and the word "tooling"). However, this indexing method has the following shortcomings:

1. The words inside a document often do not identify the type of document. For example, a document which is a letter generally does not contain the word "letter".

Thus, a search for all documents that are letters will only identify documents which contain the word "letter". Similarly, it is very difficult to identify words which occur in all letters. Furthermore, this technique requires the user to remember precise words appearing in the file. This may be especially difficult for older files for which the user cannot recall the precise contents.

2. In applications where such a method might be most useful, the search is very time consuming. If the number of files is very large, the concordance list also is very large. A partial solution to this has been to have the program continually work in the background updating the concordance list as changes are made in the files. However, this process generally disrupts a user's activity.

3. Many files (such as binary files) contain information which is in a form that is not easily interpreted by the human mind. Such files cannot be stored and retrieved by these methods.

4. In preparing a search filter, a user must type the word or words targeted in the search. In such situations, the user commonly mistypes or use a different inflection, spelling or grouping of the key words. Without using the precise words as they appear in the files, a search has an even lower probability of success.

5. Because a user may change the contents of documents, the index of words must be constantly updated. This process is time consuming and distracting. In contrast, the topical description of a document changes very little, if at all, during its lifetime.

Because of these problems, the above methods are generally used in only "last resort" searches. Thus, the user is left to negotiate the hierarchical directory structure.

Databases and outlining programs also provide methods for data storage, retrieval, or re-organization. Databases may be created using relational techniques. In relational databases, the relationships between data are typically included in the database structure. Searches in a relational database may be made by creating a search of the relations. However, database searches are usually restricted in two ways: by the field of each data element and by the content of each field. In outlining programs and other thought-organization programs, the data is generally required to be hierarchically organized at the time of data entry.

Accordingly, it would be desirable to provide a method for accessing files which provides intuitive access by user-defined topics. Such a solution should provide: easy access to a large number of files and to files having overlapping categories; simple access to files stored in a hierarchical file system without the necessity of sorting through multiple levels; access to files using predefined categories descriptive of the contents of the files; access to files which permits a user to create a search filter of categories of files using precise category names to which the files belong; and a method of accessing files which is unaffected by changes in file contents.

The present invention provides such a method.

SUMMARY OF THE INVENTION

The invention comprises a computer file control system, with a suitable user interface, implemented as a software program, which allows total freedom from the restrictions imposed by hierarchical and other present day computer filing systems.

The invention allows a user to define categories for files stored in a computer system, and to edit such categories as they are used, to designate all applicable categories for each file, and to link categories in user-definable ways. The invention further allows a user to be reminded of linked categories.

In the process of search and retrieval, the invention overcomes the problem of search filter definition, ensuring that the user defines a filter which will always find at least one file, thus avoiding wasting time in searching for data that cannot be matched. This is achieved in two ways. First, the user is not required to type the key words to search; instead, the user simply chooses the words from pick lists, making mistyping impossible. Second, as the user builds the search filter definition, categories which would find no data are automatically excluded as pick list possibilities.

More particularly, the invention allows users to define an unlimited number of their own "hybrid folders" by simply describing, using categories the user defines, the file contents of those files which are to belong to each "hybrid folder". This description is dynamic (that is, changeable by the user from time to time), and may be either totally unrestricted or restricted to a particular directory or subdirectory, as the user chooses. Such hybrid folders can be implemented on top of, and used in addition to, the normal hierarchical structured directory, or they may replace such normal structures entirely. The inventive computer file control system could therefore be used as the basis of a new computer operating system.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers refer to like elements in the drawings.

DETAILED DESCRIPTION OF THE ILLUSTRATED EMBODIMENTS

Throughout this description, the preferred embodiment and examples shown should be considered as exemplars, rather than as limitations on the present invention.

The present invention consists of a computer file control system the includes a File Category Table ("FCT") and a File Information Directory ("FID") to store information about user-defined categories and information linking such categories to specific files. The invention uses the information stored in the FCT and FID to quickly and easily access files in the file system. (The term "file" should be understood to mean any collection of data or information stored on a computer system). In the preferred embodiment, the invention includes a graphical user interface for defining categories, associating files with particular categories, and defining search filters.

File Category Table Structure

In the preferred embodiment, the FCT is a table that can be modeled as having a set of columns labeled by category-type (e.g., FILE_TYPE, CONTENTS, ACTION, etc.), with entries comprising lists of category names or descriptions (e.g., the FILE_TYPE column might have entries for AGREEMENTS, E-MAIL, MEMOS, NEWSLETTER, etc.). Each category description is a descriptive name defined by the user.

In addition, each category description is preferably associated with a unique identifier (preferably a number, but other identifiers could be used). The identifier is created by the computer (e.g., in sequential order) and used internally to manage the categories. If a user changes the name of a category description, the associated identifier is not changed. However, the invention could be implemented without using identifiers, although changes to category descriptions would then require more maintenance of the FID than with identifiers.

In the preferred embodiment, the identifier is coded so that the initial digit indicates the category type (e.g., "0xx" indicates the first category type, FILE_TYPE). This aspect is not an essential feature of the implementation of the invention, but helps the program determine, without the need of any other data fields, the column of each category description.

In the preferred embodiment, the user is provided with an FCT containing sample category descriptions. These category descriptions may be changed or deleted, and new categories may be added.

Figure 3:
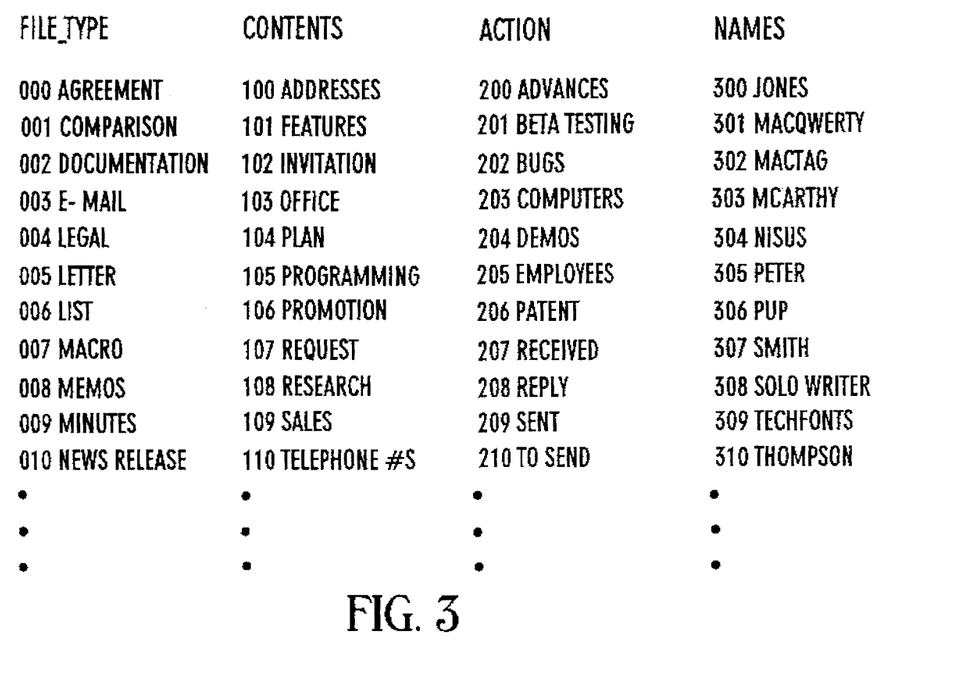
FIG. 3 shows an example of a File Category Table in accordance with the present invention.

FIG. 3 shows an example of a File Category Table in accordance with the present invention. Category types 1 are at the head of each column, and each column entry comprises a category description 2 and an associated identifier 3. Of course, in implementing the invention, the table structure shown can be configured in any desired manner, such as an array, linked list, fixed or variable record length table using sequential or hashed access, etc.

In the preferred embodiment implemented under the Apple Macintosh® System 7 operating system, category descriptions are stored as records of a random access data base file. The preferred name of the file is "FC Categories". Records are accessed by record number, in known fashion. In the preferred embodiment, category descriptions are stored in the following data structure:

```
typedef struct FC_CATEG_REC {
   LONG rec_no;              this record number
   CATEG_SYM sym;            category identifier
   CATEG_NAME name;          category name
   INT list;                 list to which the category
                             belongs (0,1,2,...)
   UINT attr;                attributes
   UINT valid;               1 when to be displayed
   LONG file_counter;        how many files use this
                             category
   INT nlinks;               number of links
   CATEG_SYM alinks[10];     category identifiers of
                             linked categories
   UCHAR filler [128]
} FC_CATEG_REC;
```

During initialization of the file control system, category descriptions (of type FTYP, FDES, CUST, NAME) are read into memory and stored in moveable memory blocks (handles). In the preferred embodiment, data about each category list is gathered in a record structure named COLUMN:

```
typedef struct COLUMN {
   RESTYPE arestype;         resource type of categories
                             in this list (category type)
   INT a_of_nn;              number of entries in this
                             column-list
   CATEG_RES **ah_to_categs; handle to array of category
                             descriptions (CATEG_RES
                             structures) in this list
   INT start_cat_vals,
      max_cat_vals;          range of category identifiers
}COLUMN;                     in this list
```

COLUMN entries are stored in an array having the structure:

COLUMN *columns;

File Information Directory Structure

In the preferred embodiment, the FID is a table that can be modeled as having a set of columns labeled by file name, file location (using direct or indirect addressing), creation and/or last update time and date for the file, number of categories associated with the file, and the identifiers of the categories associated with each file by a user.

Other file attributes may be saved in an entry, as desired. For each file that the user may want to locate at a later time, an entry is created in the FID.

Figure 4:
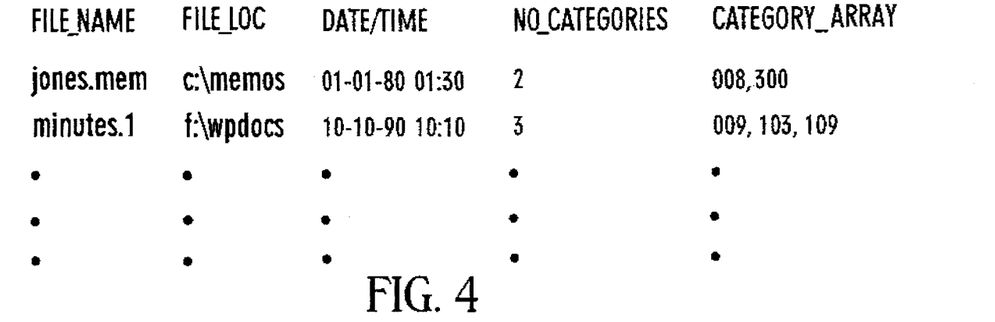
FIG. 4 shows an example of a File Information Directory in accordance with the present invention.

FIG. 4 shows an example of a File Information Directory in accordance with the present invention. Each entry has data fields that correspond to the file name (FILE_NAME) 5, file location (FILE_LOC) 6, file creation time (DATE/TIME) 7, number of associated categories (NO_CATEGORIES) 8, and an array of the identifiers of the associated categories (CATEGORY_ARRAY) 9.

When the invention is used under some operating systems, the location of each file comprises a record entry in the FID. However, in one embodiment run under the Apple Macintosh® System 7 operating system, the FID entry can be associated with a corresponding standard "Alias Record". An Alias Record contains internal system information about the file, allowing the operating system to find the file quickly even if the file has been moved and/or renamed. More particularly, the data for each file categorized by a user is stored in two resource records. One of the records is called a Catalog Entry and is stored as a resource of type 'Catalog Record'. A Catalog Entry resource record contains information describing the file and its associated category identifiers. The other record is of the type 'Alias Record', and is an Alias Record enabling rapid location of the file in the system by the operating system Alias Manager. Both resource records referring to the same file have the same resource identifiers. During initialization of the file control system, the 'Catalog Record' records are read into memory and stored in an array and serve the common purposes of displaying and selecting categorized files. The associated 'Alias Record' reside on a system storage unit (e.g., magnetic disk drive) and are read into memory only in order to locate and open a file.

Catalog entries are stored in a random access data base file with the preferred name "FC Catalog". Aliases are stored in the random access data base file with the preferred name "FC Aliases".

The preferred embodiment, the structure of the 'Catalog Record' is as follows:

```
typedef struct FC_CRP_DISK {
   LONG rec_no;              this record number
   UCHAR fnamep [FNAME_L+1]  file name (Pascal
```

-continued

| | |
|---|---|
| UNSIGNED LONG INT credat; | String) (alas) creation time/ date of the file |
| LONG alias_rec_no | corresponding 'Alias Record' record number |
| INT ncategs; | number of categories describing the file |
| CATEG_SYM acategs [MAX_CAT]; | array of categories identifiers describing the file |
| LONG creator; | |
| LONG type; | |
| UNSIGNED CHAR filler [56]; | |
| } FC_CRP_DISK; | |

CRP records in memory have the same structure. The memory list of CRP records is kept in a moveable block (handle) referred to by:

CRP **hacrp;

Overview of Operation

The invention preferably uses a windows-based graphical user interface for interacting with a user. Such interfaces are common, and include the Macintosh® System 7 operating system from Apple Computer and Microsoft Windows® from Microsoft Corporation.

The invention is activated by running a File Control (FC) Manager program that implements the invention. The FC Manager may be executed ("run") by opening a corresponding file by selecting a menu command and leaving the file open. Other methods known in the art for activating the invention could be used, such as by using a computer mouse to "click" on an icon.

During operation, the FC Manager may be in four states: Inactive, Active, Search Filter Definition, and Categorization. Search Filter Definition is a substate of the Active state. Categorization is generally a substate of the Active state, but in one case, Categorization is a substate of the Inactive state. All states require that the basic data structures described above be initialized. The initialization process initializes all the data structures by allocating memory and reading data from related data files (e.g., the FCT and FID tables, and previously saved "last used" values), in known fashion. After initialization, the FC Manager is set to the Inactive State.

The Active State enables use of the FC Manager to perform such functions as categorizing files, editing the FCT entries, defining a search filter, and locating and opening files.

1. Categorizing Files

Categorization of files in the illustrated embodiment is performed by the user from a Categories Window. In the illustrated embodiment, there are two categorization states—Active and Inactive. In the Active state, a user need only close an uncategorized file to immediately be presented by the FC Manager with the Categories Window. Typically, from within an application, the user will open a file (or, having created a new file, will make the first save to disk), at which time the FC system extension, running as a background process, will detect that action and store the path to the file in common memory. The FC Manager, running as a concurrent process, during "null events" (i.e., periods of inactivity) will retrieve this path from common memory and check the path against a list of already categorized files. If the file has not yet been categorized, the FC Manager will automatically categorize the file with the special category "Uncategorized", and notify the user that there are files to be categorized.

In the Inactive state, to categorize an open file, the user must affirmatively choose a command from a menu, e.g., a "Categorize" command, to run the FC Manager. When in the Inactive state, the user may open a file specifically for the purpose of selecting categories for that file.

In the preferred embodiment, when the FC Manager is running as a background process, each file being closed is submitted to conditional categorization, which means that only uncategorized files undergo the operation. The file being closed is identified and checked to determine whether it already has an entry in the FID. The file is assumed to be already categorized if there is an entry in the FID with the same creation date and path. In this case, no further action is taken. Otherwise, the FC Manager opens the Categories Window and the user is asked to categorize the file.

When the FC Manager opens the Categories Window, the category names stored in the FCT are displayed. Preferably, the Categories Window presents category descriptions in an organized fashion. It has been found that organizing the category names into columns helps the user to locate and select desired categories. In the illustrated embodiment, the category descriptions are displayed alphabetically in columns, with each column having a heading comprising the category type. Preferably, all category descriptions within a heading are related. However, it is often unclear in which column a given category belongs. Accordingly, the column position of a category is not significant. Columns are used for the convenience of the user in finding relevant categories and for no other reason. Further, any desired display of the category descriptions can be used.

Figure 5:
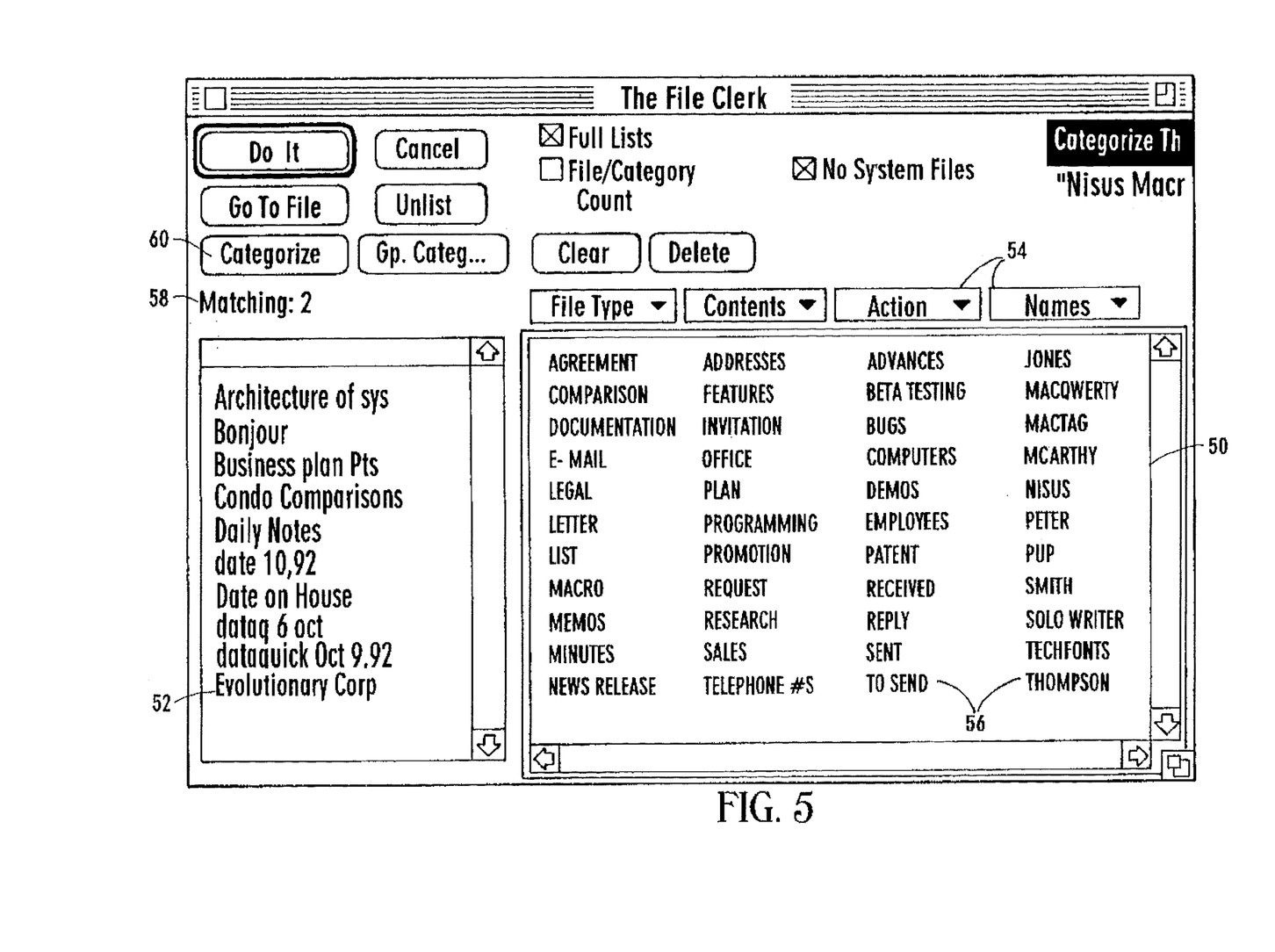
FIG. 5 shows an example of a Categories Window and File Window in accordance with the present invention.

FIG. 5 shows an example of a file manager display in accordance with the present invention. A Categories Window 50 is shown on the right side of the display, with a File Window 52 on the left side. Category types 54 are shown at the top of the Categories Window 50, with category descriptions 56 arrayed in columns below the category types 54. A tally 58 is displayed of the number of files matching selected categories, as further described below.

While the Categories Window 50 is displayed, both the category type headings and the column positions of the category descriptions may be edited by the user. In addition, category types may be added or deleted. Further, category descriptions may be edited or deleted, and new category descriptions may be added while in the Categories Window. A user is preferably warned before deleting a category description or category type. After user confirmation of deletion, the category descriptions is removed from the FCT, and all references in the FID entries to that category description are also removed. Implementation of such editing functions is known in the art of data processing, and simply cause the associated FCT and FID records to be updated.

A category description may be moved from one column (category type) to another column. In the preferred embodiment, moving is accomplished by clicking on the category description with the mouse and dragging and dropping the category description in the new column. In the illustrated embodiment, moving a category description between category types changes the category type numeric value, so all associated records in the FID containing the moved category description are checked and modified.

Categories which describe the current file can be selected by the user. This is done, for example, by pointing a computer mouse and "clicking" on each category description to be applied to the file. Preferably, the user may select as many category descriptions as apply to the particular file. After the user has completed category selection for a file, a new entry in the FID is created using the file data associated with the file, and all of the selected category descriptions. When the user has completed category selection, the Categories Window may be closed by the user, or the user may select another file for categorization.

In the preferred embodiment, a selected file that has been categorized may be recategorized using the FC Manager by clicking a "Categorize" button 60. This does not require any further file identification, as the file selected by the user contains the information necessary to perform categorization.

If the user adds more category descriptions while the Categories Window is displayed, the FC Manager also creates appropriate new unique identifier entries and the corresponding category description entries in the FCT. In subsequent references to the category descriptions by the FC Manager, these identifiers are used, the corresponding names of the categories being the way the user "connects" with these identifiers. This means that if the user changes the name of a category description, the associated identifier is not changed, thus maintaining the validity of all prior uses of that identifier in the FID.

As an example, assume a file named "jones.mem" located in the "c:\memos" subdirectory and having the file date/time of "01-01-80 01:30" is categorized by a user under the two category descriptions "MEMOS" and "JONES" (see FIG. 3). The FC Manager would make an entry in the FID table (see FIG. 4) as follows (field names are supplied for convenience):

| [FILE_NAME | FILE_LOC | DATE/TIME | NO_CAT. | CAT_ARRAY] |
|---|---|---|---|---|
| jones.mem | c:\memos | 01-01-80 01:30 | 2 | 008, 300 |

The two identifiers "008" and "300" are obtained from the FCT as the identifiers associated with the category descriptions "MEMOS" and "JONES", respectively. If the category description "MEMOS" is later changed to "NOTES", then the FID entry for "jones.mem" would still be linked to the category description "NOTES" by the identifier "008".

In the preferred embodiment, when the user clicks a "Show Usage" command from the Categories Window menu, the FC Manager checks the FID for the number of references to each category description and displays these numbers next to each category description. This feature enables the user to see which category descriptions are frequently used and which are not used at all. The unused or little used category descriptions may then be deleted, and others may be moved around for better accessibility.

If desired, the process of categorizing existing files can be totally or partially automated. After a number of files have been categorized, word patterns in categorized files can be correlated to the category descriptions. This information can be used to automatically assign (or simply suggest) category descriptions to new and existing uncategorized files.

Further, when categorizing a more extensive, broadly based set of files, category descriptions can be grouped into (overlapping) subjects or projects, with a short list of subjects or projects (effectively a top level category set) shown in a separate window (or on a menu). Once a subject or project is chosen, the category descriptions list is shortened to only show those relevant to that subject or project. Taking that idea further, the inventive categorization system can be used recursively. For example, if all the topics in the Library of Congress were categorized, the number of category descriptions needed would be impracticably large and unmanageable. If that list of category descriptions were itself regarded as the data, the invention can be applied to manage a "higher level" category list to manage and access limited portions of the complete category description list. This kind of "multi-level" categorization can be carried to any depth needed. In essence, this approach is another way of organizing lists of category descriptions of the type contemplated by the present invention, adding back some flavor of a hierarchical structure but with the added benefits of precision of input and certainty of existence.

In summary, categorization of a file in accordance with the invention involves the following steps:

1. defining a list of category descriptions;
2. associating one or more category descriptions with a file; and
3. storing a file record containing file identity information, file location information, and the associated category description(s) for the file.

Finding Files

In the process of search and retrieval, the invention overcomes the problem of search filter definition, ensuring that the user defines a filter which will always find at least one file, thus avoiding wasting time in searching for data that cannot be matched. This is achieved in two ways. First, the user is not required to type the key words to search; instead, the user simply chooses the words in random order from pick lists, making mistyping impossible. Second, as the user builds the search filter definition, categories which would find no data are automatically excluded as pick list possibilities.

In order for a user to find one or more files, the Search Filter Definition state is invoked by opening the Categories Window to display the existing category descriptions (see FIG. 5). The user initiates definition of a search filter by, for example, clicking the mouse on a "Set Categories" button. The user then selects the pre-defined category descriptions for the files which the user wants to find. In the illustrated embodiment, this is done in the same way as when categorizing a file: the user clicks the mouse on each applicable category description. After each click, the categories listed in the Categories Window are narrowed to show only those other categories which are used with the selected categories for at least one other file. The category descriptions may be selected in any order. Moreover, those category descriptions whose selection would not change the matching file list are disabled (e.g., shown as "grayed"), as further described below.

The selected categories comprise the user's search filter, which is said to define, or "map", a hybrid folder. The search filter is used to search through the FID table entries for files which match the search filter criteria, and hence come within the specified hybrid folder (that is, the search locates those file records in the FID that have identifiers that match the identifiers of the selected categories).

Any search technique may be used to search the FID table entries. For example, the FID entries may be sequentially searched and each identifier value in the CATEGORY_ARRAY field for each entry compared to the identifiers of the category descriptions selected by the user. In an alternative embodiment, a concordance file indexed by identifier value may be constructed from the FID entries, and a search conducted through the concordance file to generate a list of FID entries matching all search filter identifier values.

In addition to selecting category descriptions for the search filter, the user preferably may also group the categories, and relate the groups with logical connectors. Of course, a group may include just one category description. Although current implementations provide for an automatic "AND" conjunction between selected categories, other logical operators may be used, such as an explicit "AND" operator, or the "OR" or "NOT" operators. For example, the user may define a search filter of "MEMOS AND JONES". The FID would be searched for all entries having both the identifiers "008" (for "MEMOS") and "300" (for "JONES"). In the example shown in FIG. 4, this search filter would find at least the document "jones.mem". Although other searching mechanisms allow similar searches, none use methods which ensure certainty of existence.

In the preferred embodiment, the Categories Window display indicates how many files match the present search filter. In the illustrated embodiment, the actual number of files in the hybrid folder is displayed. However, the file names in the hybrid folder could also be displayed for this purpose.

It is expected that the FID will be relatively small for most implementations, which allows for very quick searching. In defining a search filter, the hybrid folder to which it maps should contain a sufficiently small number of files to make accessing a particular file easy. Thus, a user would normally continue to select category descriptions until the defined hybrid folder contains no more than a few (e.g., 10) files.

Once FID entries matching the search filter are located, the corresponding file names in the hybrid folder are preferably displayed in a File Window 52 (see FIG. 5). The user may then select one or more of the displayed file names, which causes the corresponding files to be retrieved from the appropriated storage device and opened (if only one file is in the hybrid folder, selecting the file can be automatic, thereby obviating display of the file name and manual selection). In operation, the selected file names together with their locations from the selected FID entries are passed to the operating system, which opens the files. Because the FID contains the location of all categorized files on disk, it is not necessary to search any other part of the disk, an action which could be very time consuming.

More particularly, in the preferred embodiment, the usual method of opening a file through the FC Manager is double-clicking on the file entry in the File Window. An alternate method is by selecting a file (by clicking on its entry or typing the first few letters of its name) and clicking on an "Open" button. Both methods can allow the opening of multiple files by using multiple selections, as is known in the art. In the preferred embodiment, the opening process consists of the following steps:

1. The selected entry in the File Window points to the corresponding FID entry. Using this pointer, the associated alias record is retrieved.
2. The alias record is passed to the operating system Alias Manager with the order for "Vast resolution". This method is able to find the file very quickly even if it has been renamed and/or moved to another system folder. If the file name has changed, the user is asked to confirm the new name.
3. If a file has been moved (not copied but moved) to another volume after categorization, and the system has been restarted, then one of the system identifiers (the File ID, which unique is within each volume) for the file has been lost. In such cases, the FC manager performs an exhaustive search of all files on all mounted volumes, searching only for files with the identical creation date and time of the subject file. The user is notified of this action.
4. The result of both searches may be a list of possible matches rather than just a single match (for example, if the file was duplicated and renamed). The FC Manager searches this list looking for files with the same name and creation date/time as in the FID entry. If none are found, then the user is presented with a list of matches with full paths found by the Alias Manager and is asked to select one for opening.
5. When a file is selected, with or without the help of the user, the alias record is checked and updated if necessary to account for any change in file name and/or location.

The result of the search process is a set of standard file identifiers, that is file name, volume reference number, and directory identification. These are passed to the opening routines in the operating system.

In the preferred embodiment, a user is prevented from defining an empty hybrid folder. All category descriptions are disabled which, if added to the search filter defined by the user, would result in no matching files. Disabling of category descriptions may by shown in many ways. For example, disabled category descriptions may be given different display attributes, such as being grayed or dimmed. Alternatively, the names of disabled category descriptions may simply not be displayed. As another alternative, the user may inhibit disabling category description list contraction by selecting a "Full Lists" option.

Determining which category descriptions are to be disabled may be accomplished in several ways. For example, in one embodiment, when no categories are selected, those categories whose identifiers are not used with any files are disabled. When one or more enabled categories are selected, the FID is searched for all files which have FID entries using all of the identifiers of all of the categories presently selected, and a determination is made as to which other categories are also used on those files. These other categories remain enabled for further selection, but all other categories are disabled.

For example, if a search filter initially includes only the category description "MEMOS", the FC Manager searches the FID for entries containing the identifier corresponding to "MEMOS". Suppose the FC Manager finds three matching files, one being categorized with the categories "MEMOS", "URGENT", and "OFFICE", another being categorized with the categories "MEMOS", "SENT", and "E-MAIL", and the third being categorized with the categories "MEMOS", "SENT", and "LETTERS". The FC Manager creates a union of the set of identifiers for all of the categories found. In this example, the union is "MEMOS", "URGENT", "OFFICE", "SENT", "E-MAIL", and "LETTERS". All categories not in this union are then disabled.

Stated another way, the FID entries are searched for matches to the most recently selected category description in a first step. As a second step, the category description identifiers in the matching FID entries are used to determine which of the remaining category descriptions are not linked by their identifiers to such entries. For example, if a search filter definition initially includes the category description "MEMOS", the FC Manager searches the FID for entries containing the identifier corresponding to "MEMOS". If, for instance, ten entries were located containing the "MEMOS" identifier, then the FC Manager uses the other identifiers in those ten entries to determine which category descriptions to disable. For instance, if none of the ten entries contain identifiers for the category descriptions "SALES" or "PATENT", then those two category descriptions would be disabled. The preferred embodiment for disabling unselectable category descriptions has the effect of making disabling cumulative, so that as the user combines more and more category descriptions in the search filter definition, more and more category descriptions will be disabled. The user chooses from an increasingly limited selection of category descriptions, but will always be assured of having at least one file in the defined hybrid folder.

The ability of the invention to suppress or disable category descriptions that will not result in a match allows definition of a logical operation called "AND PERHAPS". This operation represents a conditional "AND", which means the "AND" conjunctive operation unless with the added search term there would be no match, in which case the term is omitted from the search filter. For example, if the search filter is "MEMOS AND PERHAPS JONES", and "MEMOS" alone would have at least one match, but the addition of "JONES" would cause a non-match, then the "JONES" term is automatically excluded, with a message to the user.

Preferably, the user may also include in the search filter a range of file creation dates and/or times. Preferably, the user may select a predefined range, such as "Last 30 Days". In the illustrated embodiment, the default range is "All Dates". Preferably, those predefined date ranges which would result in no matched files if selected would be disabled. It should be understood that, in general computer systems store file creation date/time as a single relative creation time. Therefore, definition of the date range in the search filter would require a date-to-relative time conversion, as is known in the art. In alternative embodiments, other search criteria may be applied, such as file type, creator type, date last modified, or date last accessed.

To summarize, when a user clicks on a previously unselected category description, that category description is highlighted, the category description is added to the search filter definition, the current number of matching files entered in the FID is computed and displayed, each of the remaining category descriptions are evaluated to be displayed or disabled, and the new list of category descriptions is displayed in the Category Window. Generally, as each category description is selected, the list of category descriptions shrinks because of the removal of all category descriptions which, if checked further, would give zero matching files. In addition, the number of files matching the specified category descriptions is immediately shown in the File Window. These actions prevent the user from defining a hybrid folder which contains no files.

Deselecting a previously selected category description invokes the same routines, except that the result is generally an increase in the number of listed category descriptions. Widening or narrowing the date filter has a similar effect on the displayed list of category descriptions.

Preferably, the last search filter and hybrid folder are stored on a storage medium for future use. (Alternatively, the last n, or all, prior search filters and hybrid folders may be stored for future use). Thus, when a user desires to access a file, the user is immediately presented with the hybrid folder as last defined. In many instances, the desired file will be in the last hybrid folder created. To maintain information about the Categories Window and File Window, it is useful to store certain data. In the preferred embodiment, such catalog data is stored in the following record structure:

```
typedef struct SelectedFiles {
  INT file_match;           number of files matching the
                            current search filter (i.e., the
                            number of files to be displayed
                            in the File Window)
  INT *a_of_match_inds;     pointer to an array containing
                            indexes to FID entries of files
                            matching the current search filter
  INT file_marked;          number of files selected by the
                            user in the File Window
  INT *a_of_marked;         pointer to an array of indexes to
                            FID entries for the files selected
                            by user
  INT *a_of_rs;             pointer to an array of row
                            numbers in the File Window for
                            selected files (i.e., their
                            positions relative to the
                            window)
  INT from_ind;             starting index for file search
                            in the FID catalog
  INT buttons_on;           indicates whether special File
                            Window buttons are enabled
} SelectedFiles;
```

All three arrays pointed to by the structure members are dynamic, meaning that their size changes according to current needs.

In summary, finding a file in accordance with the invention involves the following steps:

1. defining a search filter of category descriptions from a pre-defined list of category descriptions;
2. searching the category descriptions of each previously stored file record for a logical match to the category descriptions of the defined search filter;
3. optionally, disabling selection of all category descriptions that would not provide a match to the defined search filter; and
4. displaying at least part of the file identity information of all records having category descriptions that logically match the category descriptions of the defined search filter.

Outdated FID

Various events may impact the integrity of the identifiers in the FID, such as changes to any part of the fully qualified file path (volume or drive, directory chain, and file name). Such events include:

1. Moving the file into another directory.
2. Changing the file name.
3. Renaming the directory containing the file.
4. Moving the directory containing the file into a different directory.
5. Moving the file to another volume (disk).
6. Deleting the file.

When the invention is implemented under the Apple Macintosh® System 7 operating system utilizing Alias Records, events 1, 2, 3, and 4 have no impact because the file ID (used to access files) is part of the Alias Record and is not changed unless the file is moved to another volume. Preferably, if the user attempts to open a file for which the name was changed, the user will be notified of that fact and will be asked to confirm that the file is the correct one.

Events 5 and 6 may cause a delay before the file is found (for event 5) or determined to no longer exist (in which case, an error message is returned). In the illustrated embodiment, when either event 5 or 6 occurs, the Alias Record for the file is updated (after user confirmation) in the FID. In this way, the FID is kept current after each access or attempted access.

On systems that do not provide Alias Records, the FID may store the fully qualified file path (volume or drive, directory chain, and file name) for the file and the file creation date/time. In such a case, a means is preferably provided for finding files which are not at the location indicated in the corresponding FID entry. For example, a search may be made, beginning with the directory closest to the file's original location, using the creation date/time as the search criteria. It has been found that a file with the identical creation date/time (to the nearest second) of the searched file is generally the desired file. However, there may be situations (such as duplicate files) where more than one such file is found. In that case, the file names of the found files are presented to the user, who selects one.

It should be noted that the present invention may be embodied as a replacement for an operating system, thus replacing the hierarchical file structure, or allowing both the hierarchical and the hybrid file structures to be used together. In such an embodiment, features for resolving ambiguities and keeping track of moved or renamed files can be further optimized using the low level access to the disk directories which the operating system controls.

Special Categories

In the preferred embodiment, category descriptions may be further characterized as "standard" or "special". The characterization of a category description may be indicated by setting a flag field in the corresponding FCT record, as provided in the data structure CATEG_RES described above.

The standard category has the attributes as described above. One special category is the "linking" category. A linking category description is linked to other "linked" category descriptions. A linking category provides for the situation when a file is described by one category description, and the file should also be described by a related category description. Such linkage may be indicated in the corresponding CATEG RES data structure described above, by recording an array of identifiers for linked category descriptions. A category may be both a linking category and a linked category.

As an example of linking and linked categories, a category named "E-Mail" could be defined as a linking category and linked to the category descriptions "Sent", "Received", "Action", "Urgent", and "Reply". Thus, when a file is categorized as "E-Mail", the user would be given an indication (by any convenient method) that the file should also be assigned to one of the linked category descriptions "Sent", "Received", "Action", "Urgent", or "Reply".

Preferably, when the user selects a linking category, the user is reminded to also select from the corresponding linked category descriptions. The linked categories may be indicated in the Categories Window using a distinctive style such as underline or bold, or using a check mark. Alternatively, a dialogue box may be displayed containing the linked category descriptions. If the user fails to select at least one of the linked category descriptions, a warning dialogue is preferably displayed.

If a user desires to delete a linking category, the linked categories are preferably indicated. The user is preferably given the opportunity to select linked categories to delete.

Another special category type can be called "encrypted". An encrypted category requires a password which is used to initiate encryption of all files which have that category. Encrypted files may not be accessed except by first entering the necessary passwords. For example, the user would be asked to enter the password for each such category description selected when creating a search filter. Since the file contents are encrypted, access without the necessary passwords would only reveal unintelligible codes.

Since files may be assigned to multiple category descriptions, more than one password may be required to access a file. However, once each password is entered, all files using that password are made accessible through the FC Manager. This method of encrypting files has an advantage over current methods in that once a password is entered, the user may access any number of files without further needing a password. Current methods of protecting individual files usually require entry of a password each time the file needs to be opened.

Many other implementations of these ideas are possible in electronic network information management, electronic mail, or any other data management systems. For example, in a large office or on a public or private electronic network, communication between people can be difficult because of the very large number of people trying to communicate. After a certain point, there is an information overload and it is too time consuming to try to search through all the messages for the few of interest. Using the invention, a category description list could be defined for all possible topics (with constant updating by the network administrator and/or by the users). Each user could then use this list of category descriptions to both post messages and search for messages on topics of interest to the user. The user could also set up sets of search filters for particularly important topics. If any messages were to be posted whose topics matched those search filters, they would be immediately sent to the user.

Accordingly, the present invention provides a method for accessing files which has intuitive access by user-defined topics. More particularly, the invention provides: easy access to a large number of files and to files having overlapping categories; simple access to files stored in a hierarchical file system without the necessity of sorting through multiple levels; access to files using predefined categories descriptive of the contents of the files; access to files which permits a user to create a search filter of categories of files using precise category names to which the files belong, with the assurance that the filter will always find some files (although possibly deleted); and a method of accessing files which is unaffected by changes in file contents.

A number of embodiments of the present invention have been described. Nevertheless, it will be understood that various modifications may be made without departing from the spirit and scope of the invention. For example, although the above description has been made with respect to a single computer system, that term is meant to include distributed data storage environments, such as networked computers. Further, although the above description has contemplated that the "user" is a person, the invention can be readily adapted to interact with another computer as the "user". Accordingly, it is to be understood that the invention is not to be limited by the specific illustrated embodiment, but only by the scope of the appended claims.

We claim:

1. A method for accessing files in a data storage system of a computer system having means for reading and writing data from the data storage system, displaying information, and accepting user input, the method comprising the steps of:

(a) initially creating in the computer system a category description table containing a plurality of category descriptions, each category description comprising a descriptive name, the category descriptions having no predefined hierarchical relationship with such list or each other;

(b) thereafter creating in the computer system a file information directory comprising at least one entry corresponding to a file on the data storage system, each entry comprising at least a unique file identifier for the corresponding file, and a set of category descriptions selected from the category description table; and (c) thereafter creating in the computer system a search filter comprising a set of category descriptions, wherein for each category description in the search filter there is guaranteed to be at least one entry in the file information directory having a set of category descriptions matching the set of category descriptions of the search filter.

2. A method for accessing files in accordance with claim 1, wherein each category description comprises a user defined category name and a unique category description identifier created by the computer system.

3. A method for accessing files in accordance with claim 2, wherein each category description further comprises a category type designation.

4. A method for accessing files in accordance with claim 2, wherein the step of creating a category description table comprises the steps of:

(1) accepting user input defining a new category description;

(2) displaying the new category description;

(3) creating a unique category description identifier associated with the new category description; and (4) storing the new category description and unique category description identifier in the category description table.

5. A method for accessing files in accordance with claim 4, wherein the step of creating a file information directory comprises the steps of:

(1) accepting user input selecting a file;

(2) displaying each category description in the category description table;

(3) accepting user input associating the selected file with at least one category description selected by the user from the displayed category descriptions;

(4) creating a new entry in the file information directory;

(5) storing in the new entry the file identifier of the selected file; and (6) storing in the new entry the category description identifier of each of the selected category descriptions.

6. A method for accessing files in accordance with claim 5, wherein the data storage system further includes a file name for each file and the step of selecting a file comprises the steps of:

(1) displaying at least one file name; and (2) accepting a user selected of a file from the displayed file names.

7. A method for accessing files in accordance with claim 1, wherein the step of creating a search filter comprises the steps of:

(1) disabling category descriptions which if added to the search filter would not match the category descriptions of at least one entry in the file information directory;

(2) accepting user input selecting at least one category description as a component of the search filter.

8. A method for accessing files in accordance with claim 7, wherein disabled category descriptions are indicated by means of a unique display attribute.

9. A method for accessing files in accordance with claim 7, wherein the step of creating a search filter further comprises the steps of;

(1) relating at least two selected category descriptions with logical operations.

10. A method for accessing files in accordance with claim 7, wherein the data storage system includes the time of creation of each file, and the step of creating a search filter further comprises the step of:

(1) accepting user input defining a time range to limit matching to only those entries in the file information directory having creation times in the selected time range.

11. A method for accessing files in accordance with claim 7, wherein each category description comprises a user defined category description name and a unique category description identifier created by the computer system, and further including the step of displaying the name of each file in the file information directory having category description identifiers matching the category description identifiers of the category descriptions in the search filter.

12. A method for accessing files in accordance with claim 11, further comprising the steps of:

(1) selecting one of the displayed file names; and (2) opening the file corresponding to the selected file name.

13. A method for accessing files in accordance with claim 12, wherein the step of selecting a file name comprises the step of:

(1) accepting user input selecting a file from the displayed file names.

14. A method for accessing files in accordance with claim 12 wherein the step of opening a file comprises the step of:

(1) testing if only one file name is displayed, and if so, then opening the file corresponding to that file name.

15. A system for accessing files in a data storage system comprising:

(a) a plurality of files in a data storage system;

(b) a plurality of user-defined category descriptions, each category description comprising a descriptive name, the category descriptions having no predefined hierarchical relationship with such list or each other;

(c) file association means for associating at least one file with at least one category description selected from the plurality of previously defined category descriptions;

(d) category description addition means for adding one or more additional category descriptions to the plurality of user-defined category descriptions; and (e) category linking means for linking at least one linking category description to at least one linked category description, such that if a specific file is associated with a linking category description, the user must also associate that specific file with at least one of the linked category descriptions corresponding to the linking category description.

16. A system for accessing files in a data storage system as set forth in claim 15, further including a linking reminder activated upon associating a specific file with a linking category description, such that the linking reminder provides an indication to the user that the user must associate that file with at least one of the linked category descriptions corresponding to the linking category description.

17. A system for accessing files in a data storage system as set forth in claim 15, further including password-controlled file encryption means for encrypting at least one of the plurality of files, such that if a specific file is encrypted, associating that file with a category requires provision by the user of a password, and any access to that file requires provision by the user of a password.

18. A system for accessing files in a data storage system of a computer system having means for reading and writing data from the data storage system, displaying information, and accepting user input, wherein each file located on the data storage system has a file name, the system comprising:
 (a) means for initially defining in the computer system at least one list having a plurality of category descriptions, each category description comprising a descriptive name, the category descriptions having no predefined hierarchical relationship with such list or each other;
 (b) means for thereafter accepting user input associating with a file at least one category description from at least one defined list;
 (c) means for storing in the data storage system a file record containing at least the file name, file location information, and the associated category descriptions for the file;
 (d) means for displaying from each defined list, as selectable items, only those category descriptions associated with at least one file;
 (e) means for accepting user positional input defining a search filter of at least one category description selected from at least one displayed defined list;
 (f) means for automatically disabling, in the computer system, selectability of all other category descriptions in each displayed list that do not have associated files which are also associated with the category descriptions of the defined search filter;
 (g) means for searching in the computer system the category descriptions of each stored file record for a logical match to the category descriptions of the defined search filter;
 (h) means for displaying the file names of all file records having category descriptions that logically match each category description of the defined search filter.

19. The system for accessing files of claim 18, further including:
 (a) means for accepting user input selecting at least one file from the displayed file names;
 (b) means for accessing each selected file on the data storage system using the file location information from the file record associated with each corresponding selected file.

20. A method for accessing files in a data storage system of a computer system having means for reading and writing data from the data storage system, displaying information, and accepting user input, wherein each file located on the data storage system has a file name, the method comprising the steps of:
 (a) initially defining in the computer system at least one list having a plurality of category descriptions, each category description comprising a descriptive name, the category descriptions having no predefined hierarchical relationship with such list or each other;
 (b) thereafter accepting user input associating with a file at least one category description from at least one defined list;
 (c) storing in the data storage system a file record containing at least the file name, file location information, and the associated category descriptions for the file;
 (d) displaying from each defined list, as selectable items, only those category descriptions associated with at least one file;
 (e) accepting user positional input defining a search filter of at least one category description selected from at least one displayed defined list;
 (f) automatically disabling, in the computer system, selectability of all other category descriptions in each displayed list that do not have associated files which are also associated with the category descriptions of the defined search filter;
 (g) searching in the computer system the category descriptions of each stored file record for a logical match to the category descriptions of the defined search filter;
 (h) displaying the file names of all file records having category descriptions that logically match each category description of the defined search filter.

21. The method for accessing files of claim 20, further including the steps of:
 (a) accepting user input selecting at least one file from the displayed file names;
 (b) accessing each selected file on the data storage system using the file location information from the file record associated with each corresponding selected file.

* * * * *

(12) EX PARTE REEXAMINATION CERTIFICATE (8377th)
United States Patent
Lewak et al.

(10) Number: US 5,544,360 C1
(45) Certificate Issued: Jul. 5, 2011

(54) METHOD FOR ACCESSING COMPUTER FILES AND DATA, USING LINKED CATEGORIES ASSIGNED TO EACH DATA FILE RECORD ON ENTRY OF THE DATA FILE RECORD

(75) Inventors: Jerzy Lewak, Del Mar, CA (US); Slawek Grzechnik, La Mesa, CA (US); Jon Matousek, San Diego, CA (US)

(73) Assignee: SpeedTrack, Inc., Los Angeles, CA (US)

Reexamination Request:
No. 90/010,325, Oct. 24, 2008

Reexamination Certificate for:
Patent No.: 5,544,360
Issued: Aug. 6, 1996
Appl. No.: 08/384,379
Filed: Feb. 3, 1995

Related U.S. Application Data (63) Continuation of application No. 07/980,620, filed on Nov. 23, 1992, now abandoned.

(51) Int. Cl.
G06F 17/30 (2006.01)

(52) U.S. Cl. .......................... 707/999.001; 707/E17.01; 707/E17.012; 707/E17.143

(58) Field of Classification Search .................. 707/1, 707/E17.01, E17.012, E17.143
See application file for complete search history.

(56) References Cited

U.S. PATENT DOCUMENTS

| | | | |
|---|---|---|---|
| 4,829,423 A | 5/1989 | Tennant et al. ............ 364/200 |
| 4,868,733 A | 9/1989 | Fujisawa et al. | |
| 4,879,648 A | 11/1989 | Cochran et al. ........... 364/300 |
| 4,974,170 A | 11/1990 | Bouve et al. | |
| 5,047,918 A | 9/1991 | Schwartz et al. | |
| 5,050,071 A | 9/1991 | Harris et al. | |
| 5,062,074 A | 10/1991 | Kleinberger ............... 364/900 |
| 5,093,911 A | 3/1992 | Parks et al. | |
| 5,111,426 A | 5/1992 | Bergstresser, Sr. et al. | |
| 5,162,992 A | 11/1992 | Williams | |
| 5,204,812 A | 4/1993 | Kasiraj et al. | |
| 5,204,947 A | 4/1993 | Bernstein et al. | |
| 5,270,689 A | 12/1993 | Hermann ................... 345/145 |
| 5,535,382 A | 7/1996 | Ogawa | |
| 5,761,655 A | 6/1998 | Hoffman | |
| 6,247,031 B1 | 6/2001 | Sugiura et al. | |

FOREIGN PATENT DOCUMENTS

JP S64-1030 1/1989

OTHER PUBLICATIONS

Everett, William et al. "Applying Software Reliability Engineering in the 1990s". *IEEE Transactions on Reliability*, vol. 47, No. 3–SP. Sep. 1998. pp. 372–378.*
Pham, Hoang. *System Software Reliability*. Springer—Verlag London Limited. 2006. pp. 1–7.*
Robert Godin et al., *Design of a Browsing Interface for Information Retrieval*, 12th Annual Int'l ACM SIGIR Conference on Research and Dev. In Info. Retrieval, at 32–39 (1989).

(Continued)

*Primary Examiner*—Sara S Clarke (57) ABSTRACT

A computer filing system for accessing files and data according to user-designated criteria. The system allows the user to define a virtually unlimited number of hybrid folders by describing, using terms of their own selection, the file contents of those files which are to belong to particular hybrid folders. Such hybrid folders can be implemented on top of, and used in addition to, the normal hierarchical structured directory, or they may replace such normal structures entirely. The inventive computer file control system could therefore be used as the basis of a new computer operating system. In the process of search and retrieval, the invention ensures in two ways that the user defines a filter which will always find at least one file. The user is not required to type the key words to search but instead chooses the words from pick lists, making mistyping impossible. As the user builds the search filter definition, categories which would find no data are automatically excluded as pick list possibilities.

OTHER PUBLICATIONS

Ben Shneiderman, *Visual User Interfaces for Information Exploration*, 54th Annual Meeting of Am. Soc'y for Info. Sci, vol. 28, 379–384 (1991).

Lotus Agenda 2.0, as described in Mary Campbell, Agenda 2.0® Made Easy, McGraw–Hill (1991).

Pollitt, A.S., "End User Touch Searching for Cancer Therapy Literature—A Rule Based Approach", Dept. of Comp. Studies & Math, Huddersfield Polytechnic, UK, 1983, p. 136–145.

Fallows, J., "Hidden Powers" Agenda Can Organize Your Life Better than Ordinary Programs, The Atlantic, May 1992, vol. 269, No. 5, pp. 114–117.

Anick, Peter, et al., "Addressing the Requirements of a Dynamic Corporate Textual Information Base", Intelligent Information Applications Development Group, Digital Equipment Corporation71, 1991, pp. 163–172.

Nelson, T.H., "A File Structure for the Complex, the Changing and the Indeterminate", Vassar College, NY, Session 4, ACM 20th National Conference, 1965, pp. 84–100.

Sechrest, Stuart, "Attribute–Based Naming of Files", Dept. of Electric. Engineering and Computer Science, Univ. of Michigan, Jan. 1991, CSE–TR–78–91, pp. 1–24.

Burnaugh, Howard P., The BOLD (Bibliographic On–Line Display) System, System Development Corporation, SP–2338/000/01, Apr. 6, 1966, Santa Monica, CA, pp. 1–23.

Noerr, Peter, et al., "Browse and Navigate: An Advance in Database Access Methods", Information Processing & Management, 1985, vol. 21, No. 3, pp. 205–213.

Palay, Andrew, et al., "Browsing through Databases", Proceedings of 3rd Annual ACM Conf. on Research & Dev., Cambridge, England, Jun. 23–27, 1980, pp. 310–324.

Wong, Eugene, et al., "Canonical Structure in Attribute Based File Organization", UC Berkeley, Communications of the ACM, Sep. 1971, vol. 14, No. 9, pp. 593–597.

Central Point, Version 7, PC Tools, Central Point Software, Inc., Copyright 1991, pp. 32–34, including Table of Contents.

Godin, Robert, et al., "Lattice Model of Browsable Data Spaces", Information Sciences, vol. 40, 1986, pp. 89–116.

"Info Select, Operations Guide", Micro Logic Corp., Hakensack, NJ, Jul. 1990, 120 pages.

Duval, E. et al., "Towards the Integration of a Query Mechanism and Navigation for Retrieval of Data on Multimedia Documents" Jul. 29, 1992, pp. 8–25.

Takahashi, Mitsuo, "Chapter 18 Mac Business Series", 4 pgs—translation of article in "My Computer Magazine", 1992, pp. 160–164.

Translation of "Thought Pattern" Japanese Version, "Organization Tool for Information you Can't Sort", Version 1, Banana–fish Software, 8 pages.

Said, Carolyn, Paragon Caters to PowerBook Buyers with Slimmed–Down Nisus Compact, MacWeek, Oct. 29, 1991, vol. 5, No. 37, 4 pgs.

Pollitt, A., "A Common Query Interface Using Menuse—A Menu–Based User Search Engine", 12th International Online Meeting, London, Dec. 1988, London, Dec. 1988, pp. 445–457.

Meadow, Charles T., "Online Access to Knowledge: System Design", Journal of the American Society for Information Science, 40(2), 1989, pp. 86–98.

Gifford, David, et al., "Intelligent File Systems for Object Repositories", Operating Systems for the 90s and Beyond, Intl. Workshop, Jul. 8–12, 1991, Germany, pp. 20–24.

Economou, Maria, "Quest for the Golden Apples of the Hesperides", Archives & Museum Informatics, 1995, pp. 248–266.

Mogul, Jeffrey, "Representing Information about Files" Dept. of Computer Science, Stanford University, CA, Report No. STAN–CS–86–1103, Mar. 1986, 182 pages.

Gifford, David, "Semantic File Systems", Proceedings of the 13th ACM Symposium on Operating System Principles, p. 16–25, Oct. 1991.

Borko, H., "Utilization of On–Line Interactive Displays", Third Congress on Information System Science and Technology, Buck Hill Falls, PA, Nov. 20–23, 1966, 34 pgs.

\* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-4, 7, 11-14, 20 and 21 is confirmed.

New claim 22 is added and determined to be patentable.

Claims 5, 6, 8-10 and 15-19 were not reexamined.

*22. A method for accessing files in a data storage system of a computer system having means for reading and writing data from the data storage system, displaying information, and accepting user input, the method comprising the steps of:*

*(a) initially creating in the computer system a category description table containing a plurality of category descriptions, each category description comprising a descriptive name, the category descriptions having no predefined hierarchical relationship with such list or each other;*

*(b) thereafter creating in the computer system a file information directory comprising at least one entry corresponding to a file on the data storage system, each entry comprising at least a unique file identifier for the corresponding file, and a set of category descriptions selected from the category description table;*

*(c) thereafter creating in the computer system a search filter comprising a set of category descriptions, wherein for each category description in the search filter there is guaranteed to be at least one entry in the file information directory having a set of category descriptions matching the set of category descriptions logically combined in the search filter, said set of category descriptions logically combined selected by choosing one category description at a time, in any order.*

* * * * *